(12) United States Patent  
Nyhuis

(10) Patent No.: US 8,911,628 B2  
(45) Date of Patent: Dec. 16, 2014

(54) METHOD FOR THE BIOLOGICAL PURIFICATION OF AMMONIUM-CONTAINING WASTEWATER

(75) Inventor: Geert Nyhuis, Gommiswald (CH)

(73) Assignee: Demon GmbH, Gommiswald (CH)

( * ) Notice: Subject to any disclaimer, the term of this patent is extended or adjusted under 35 U.S.C. 154(b) by 0 days.

(21) Appl. No.: 13/583,484

(22) PCT Filed: Feb. 1, 2011

(86) PCT No.: PCT/IB2011/000159  
§ 371 (c)(1),  
(2), (4) Date: Sep. 7, 2012

(87) PCT Pub. No.: WO2011/110905  
PCT Pub. Date: Sep. 15, 2011

(65) Prior Publication Data  
US 2013/0001160 A1  Jan. 3, 2013

(30) Foreign Application Priority Data

Mar. 10, 2010  (EP) .................................. 10002478

(51) Int. Cl.  
*C02F 3/30* (2006.01)  
*C02F 11/12* (2006.01)  
*C02F 11/04* (2006.01)  
*C02F 101/16* (2006.01)

(52) U.S. Cl.  
CPC ............... *C02F 3/301* (2013.01); *C02F 11/121* (2013.01); *C02F 3/307* (2013.01); *C02F 11/04* (2013.01); *C02F 2101/16* (2013.01); *C02F 2301/046* (2013.01); *C02F 2303/06* (2013.01); *Y02E 50/343* (2013.01)  
USPC ............ 210/605; 210/609; 210/623; 210/630

(58) Field of Classification Search  
CPC .......... C02F 3/121; C02F 3/301; C02F 3/302; C02F 3/1263; C02F 11/04; C02F 11/121; C02F 2101/16; C02F 2101/163; C02F 2101/166; C02F 2301/046; C02F 2303/06; Y10S 210/903  
USPC ......... 210/620, 626, 623, 605, 624, 625, 630, 210/903, 609  
See application file for complete search history.

(56) References Cited

U.S. PATENT DOCUMENTS 6,163,932 A * 12/2000 Rosen ............................ 210/605  
6,485,646 B1 * 11/2002 Dijkman et al. ............... 210/610

(Continued)

FOREIGN PATENT DOCUMENTS

EP  0327184 A1  8/1989  
EP  0503546 A1 *  9/1992  ................ C02F 3/34

(Continued)

OTHER PUBLICATIONS

WO 9733839, EPO English Machine Translation.*

(Continued)

*Primary Examiner* — Lore Jarrett  
*Assistant Examiner* — Patrick Orme  
(74) *Attorney, Agent, or Firm* — Leydig, Voit & Mayer, Ltd.

(57) ABSTRACT

A method for the biological purification of ammonium-containing wastewater. The wastewater is purified in an aeration tank in which a low oxygen concentration of less than 1.0 mg/l is set so as to first convert, using aerobically oxidizing bacteria, ammonium contained in the wastewater to nitrite and then to convert, using anaerobically oxidizing bacteria, ammonium and nitrite to elemental nitrogen. At least a part of surplus sludge formed in the aeration tank is separated into a heavy sludge phase and a light sludge phase. The light sludge phase is fed as surplus sludge to a sludge digestion. Sludge water that is separated off from the sludge in a sludge dewatering is fed to a deammonifying tank. Nitrogen compounds in the sludge water are converted, by deammonification in the deammonifying tank, to elemental nitrogen. Surplus sludge formed in the deammonifying tank is fed to the aeration tank.

20 Claims, 1 Drawing Sheet

(56) References Cited

U.S. PATENT DOCUMENTS

| | | | |
|---|---|---|---|
| 6,602,417 B1 * | 8/2003 | Zilverentant | 210/605 |
| 7,387,723 B2 * | 6/2008 | Jordan | 210/220 |
| 7,438,813 B1 * | 10/2008 | Pedros et al. | 210/603 |
| 7,846,334 B2 | 12/2010 | Wett | |
| 2008/0283469 A1 * | 11/2008 | Pollock | 210/608 |

FOREIGN PATENT DOCUMENTS

| | | | | |
|---|---|---|---|---|
| KR | 20030084199 A | | 11/2003 | |
| WO | WO 9733839 A1 | * | 9/1997 | C02F 11/12 |
| WO | WO 0005176 A1 | | 2/2000 | |
| WO | WO 2007033393 A1 | | 3/2007 | |

OTHER PUBLICATIONS

EP 0503546, EPO English Machine Translation.*
WO 9733839, USPTO Human English Translation.*
EP 0503546, USPTO Human English Translation.*
Cho, G.S. et al. Advanced wastewater treatment method using nitrifying bacteria cultivated with fermented solution generated from anaerobic/aerobic sludge digestion. vol. 2004, Nr:18, Nov. 1, 2003.
European Patent Office, International Search Report in International Patent Application No. PCT/IB2011/000159 (Jul. 6, 2011).

* cited by examiner

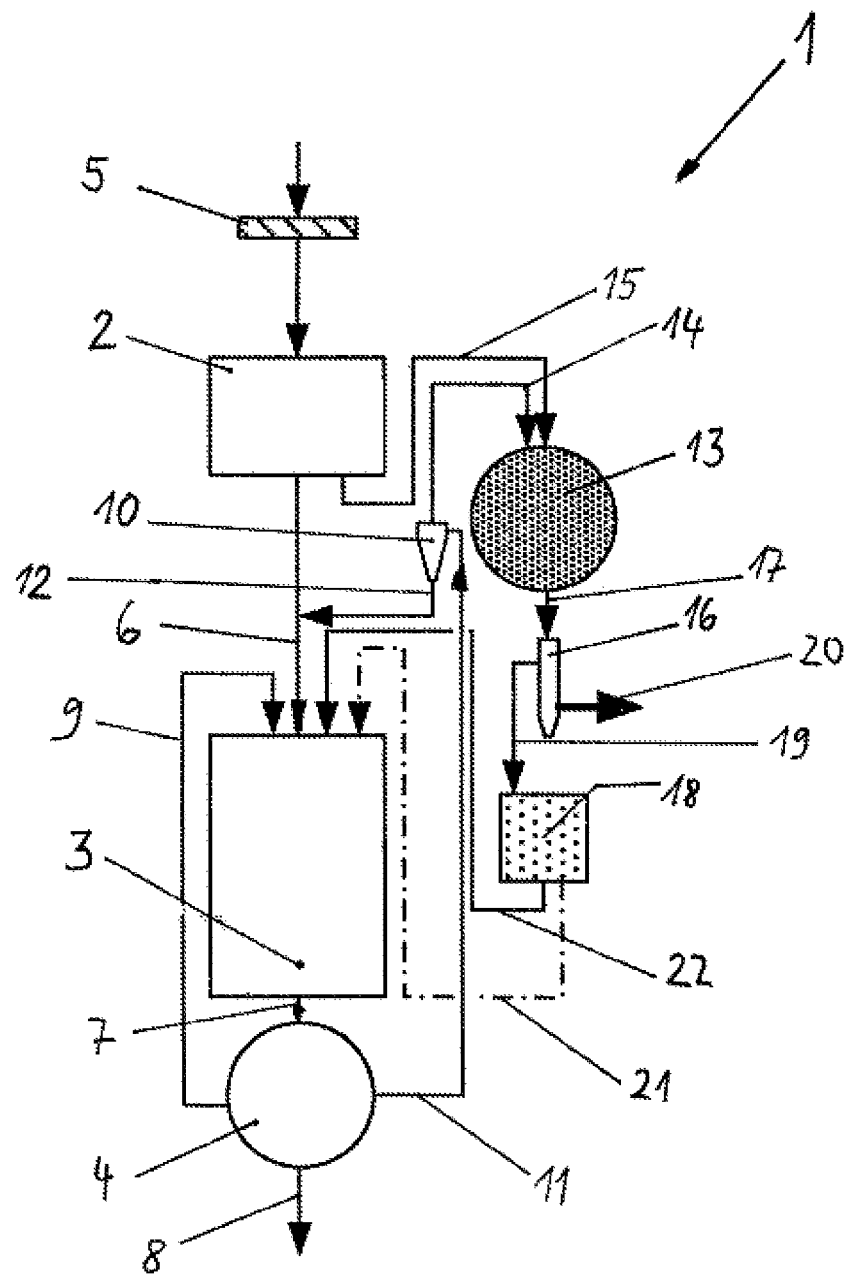

METHOD FOR THE BIOLOGICAL PURIFICATION OF AMMONIUM-CONTAINING WASTEWATER

CROSS-REFERENCE TO PRIOR APPLICATIONS

This application is a U.S. National Phase application under 35 U.S.C. §371 of International Application No. PCT/IB2011/000159, filed on Feb. 1, 2011, and claims benefit to European Patent Application No. EP 10 002 478.5, filed on Mar. 10, 2010. The International Application was published in German on Sep. 15, 2011 as WO 2011/110905 under PCT Article 21(2).

FIELD

The invention relates to a method for the biological purification of ammonium-containing wastewater.

BACKGROUND

Municipal wastewater having more or less large amounts of industrial wastewaters is purified in a plant consisting of a primary clarifier, an aeration tank and a secondary clarifier. The wastewater, which, depending on the time of year, has a temperature from 7 to 25° C. and a nitrogen concentration from about 30 to 70 mg/l, after a first mechanical cleaning, which consists of a screen system and a primary clarifier, is introduced into an aeration tank.

In the aeration tank the actual biological purification of the wastewater takes place. Here, the nitrogen compounds which are bound in the wastewater, such as ammonium ($NH_4$), nitrite ($NO_2$) and nitrate ($NO_3$), are converted by nitrification/denitrification to elemental nitrogen ($N_2$) which is released in the gaseous state into the ambient air as a harmless end product. During the nitrification, ammonium is oxidized by oxygen via the intermediate nitrite to form nitrate. In the subsequent denitrification, the nitrate is reduced in a first reduction step to nitrite, and in a second reduction step, to nitrogen.

The biological nitrification/denitrification has the disadvantage of a high oxygen demand and therefore high energy consumption. In addition, organic carbon is consumed in the denitrification which is disadvantageous for the further purification process and the sludge properties.

After the biological purification of the wastewater in the aeration tank, the wastewater-sludge mixture is passed into the secondary clarifier of the plant in which the water is separated from the sludge, wherein the separated water is removed from the secondary clarifier and disposed of and the sludge is in part returned as return sludge to the aeration tank and in part fed as surplus sludge to a digestion tank. In the digestion tank, or during the transport to the digestion tank, the sludge is heated to a temperature of about 40° C. During the sludge digestion, the organic constituents of the surplus sludge from the secondary clarifier and of the sludge withdrawn from the wastewater in the primary clarifier are converted into gas (methane). The nitrogen present remains in the sludge in which there is now a high nitrogen concentration of typically 500 to 2000 mg/l. This high-nitrogen sludge, after the sludge digestion in the digestion vessel, is fed to an appliance for sludge dewatering, for example a centrifuge. The aqueous phase, after the sludge dewatering, contains the nitrogen and has a temperature of about 25 to 39° C. The warm, high-nitrogen sludge water is then fed to a deammonifying tank, while the sludge that is separated off from the sludge water is disposed of.

In the deammonifying tank, the nitrogen compounds ($NH_4$, organic nitrogen) that are present in the sludge water are converted by deammonification into elemental nitrogen ($N_2$) which is outgassed to the ambient air. The surplus sludge formed in the deammonification is then fed to the sludge treatment.

Deammonification is an efficient method for biological elimination of nitrogen, in particular for the purification of wastewaters having high ammonium concentrations. In the biological deammonification with suspended biomass, two bacterial groups participate, firstly the aerobically ammonium-oxidizing bacteria (AOB) which convert ammonium to nitrite, and secondly the anaerobically ammonium-oxidizing and elemental nitrogen-producing bacteria (ANAMMOX), in particular Planctomycetes, which carry out this step with the aid of the previously produced nitrite.

The aerobically ammonium-oxidizing bacteria (AOB) produce 10 times more new bacterial mass, based on the material conversion rate, than the anaerobically ammonium-oxidizing bacteria (ANAMMOX). The residence time of the sludge in the sludge system must therefore be at least long enough that the slow-growing anaerobically ammonium-oxidizing bacteria (ANAMMOX) can accumulate.

Compared with the nitrification/denitrification, during the deammonification, only half of the oxygen is required, or the energy consumption for nitrogen elimination is halved. The deammonification is an autotrophic process in which no organic carbon is required. Therefore, the remaining purification process is more stable.

Methods for single-stage or two-stage biological deammonification are already known from WO 2007/033393 A1, EP 0 327 184 B1 and WO 00/05176 A1.

In particular, the substantially longer generation times of the anaerobically ammonium-oxidizing bacteria (ANAMMOX) have proved to be disadvantageous in the deammonification, which generation times are longer by the factor 10 to 15 than those of the aerobically ammonium-oxidizing bacteria (AOB). As a result, a stable system can only form when the residence time of the sludge or of the bacteria in the tank is sufficiently high. This in turn necessitates large reaction volumes and correspondingly constructed tanks.

In addition, a sufficiently high wastewater temperature (>25° C.) is fundamental for the growth of the anaerobically ammonium-oxidizing bacteria (ANAMMOX) on an industrial scale. However, heating of the wastewater is highly demanding in terms of energy, for which reason the methods described cannot be used or carried out economically with wastewaters at low temperatures.

In addition, the presence of those bacterial groups that convert the nitrite formed into nitrate under aerobic conditions ("nitrite-oxidizing bacteria," or NOB) proves to be disadvantageous. This group of bacteria has generation times shorter by the factor 10 compared with the anaerobically ammonium-oxidizing bacteria (ANAMMOX).

For the said reasons, the application of deammonification is restricted to warm wastewater streams which simultaneously have a high nitrogen concentration. Application of deammonification in the case of cold wastewaters having low nitrogen concentrations would necessitate very high reaction volumes that are not economically expedient. Conventional nitrifying plants already require a tank volume that typically must ensure a sludge age of 15 to 20 days. For application of deammonification, these tank volumes would have to be increased further by the factor 10 to 15.

Furthermore, EP 0 503 546 B1 discloses a method for purifying wastewater by nitrification/denitrification, in which in a collection container, a metabolically active nitrifying bacteria population is cultured, from which biomass is transferred continuously or at intervals into a biological purification step, where a post-loaded material stream having a high nitrogen loading is passed into the collecting container.

SUMMARY

In an embodiment, the present invention provides a method for the biological purification of ammonium-containing wastewater. The wastewater is purified in an aeration tank in which a low oxygen concentration of less than 1.0 mg/l is set so as to first convert, using aerobically oxidizing bacteria (AOB), ammonium ($NH_4$) contained in the wastewater to nitrite ($NO_2$) and then to convert, using anaerobically oxidizing bacteria (ANAMMOX), ammonium ($NH_4$) and nitrite ($NO_2$) to elemental nitrogen ($N_2$). At least a part of surplus sludge formed in the aeration tank is separated into a heavy sludge phase containing the anaerobically oxidizing bacteria (ANAMMOX) and a light sludge phase. The heavy sludge phase is returned to the aeration tank and the light sludge phase is fed as surplus sludge to a sludge digestion, wherein organic constituents of the sludge are converted to gas. Sludge from the sludge digestion is fed to a sludge dewatering. High-nitrogen and warm sludge water that is separated off from the sludge in the sludge dewatering is fed to a deammonifying tank. Nitrogen compounds ($NH_4$, organic nitrogen) in the sludge water are converted, by deammonification in the deammonifying tank, to elemental nitrogen ($N_2$). Surplus sludge formed in the deammonifying tank is fed to the aeration tank.

BRIEF DESCRIPTION OF THE DRAWING

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which: shows a plant for the biological purification of ammonium-containing wastewater in a simplified system presentation according to an embodiment of the present invention.

DETAILED DESCRIPTION

In an embodiment, the invention provides an improved and economically feasible method for the purification of ammonium-containing wastewater, in particular of cold wastewater having a temperature below 25° C.

In an embodiment, the invention relates to a method for the biological purification of ammonium-containing wastewater, in particular cold wastewater between 7 and 25° C., in an aeration tank in which the ammonium ($NH_4$) contained in the wastewater is reacted at a predetermined oxygen concentration to form elemental nitrogen ($N_2$) and a surplus sludge formed in the reaction is fed at least in part to a sludge digestion, during which the organic constituents of the sludge are converted to gas, wherein the sludge is then fed to a sludge dewatering and the high-nitrogen, warm sludge water that is separated off from the sludge and which has, in particular, a nitrogen concentration from 500 to 2000 mg/l and a temperature of about 25 to 39° C. is then fed to a deammonifying tank, in which the nitrogen compounds ($NH_4$, organic nitrogen) contained in the sludge water are converted by deammonification to elemental nitrogen ($N_2$).

According to an embodiment of the invention, therefore, a method is provided in which a surplus sludge formed in the deammonification of the sludge water is fed to the aeration tank and a low oxygen concentration of less than 1.0 mg/l is set in the aeration tank in such a manner that the ammonium ($NH_4$) present in the wastewater is first converted using aerobically oxidizing bacteria (AOB) to nitrite ($NO_2$) and then, using anaerobically oxidizing bacteria (ANAMMOX), in particular Planctomycetes, ammonium ($NH_4$) and nitrite ($NO_2$) are converted to elemental nitrogen ($N_2$), wherein the surplus sludge formed in this deammonification in the aeration tank, before the feed to the sludge digestion, is separated into a heavy sludge phase which contains mainly the anaerobically ammonium ($NH_4$)-oxidizing bacteria (ANAMMOX), and a light sludge phase, wherein the heavy sludge phase is returned to the aeration tank and the light sludge phase is fed as surplus sludge to the sludge digestion.

By introducing the surplus sludge from the deammonifying tank into the aeration tank and simultaneously limiting the oxygen concentration to less than 1.0 mg/l, it becomes possible for the first time to employ the deammonification in the case of municipal and/or industrial wastewaters in the aeration tank also, despite the low wastewater temperature and the low nitrogen concentration. The deammonifying tank acts in the method according to an embodiment of the invention as a growth tank for the bacteria necessary in the deammonification in the aeration tank, in particular the Planctomycetes. By this means, the problem of the low growth rates as a consequence of the low wastewater temperatures in the aeration tank is solved. In addition, by setting the low oxygen level in the aeration tank, inhibition of the Planctomycetes is prevented.

In addition, the use of deammonification in the aeration tank is promoted in that the surplus sludge from the aeration tank produced in the deammonification is subsequently separated into a heavy sludge phase which contains the majority of the anaerobically ammonium-oxidizing bacteria (ANAMMOX), and a light sludge phase, and the heavy phase is returned to the aeration tank.

Because the Planctomycetes do not occur in the flock aggregate and have a relatively high density, the surplus sludge can be separated into a heavy phase and a light phase. The Planctomycetes grow very densely, having a density of approximately $10^{10}$ bacteria/ml. By feeding the light phase into the sludge digestion and returning the heavy phase to the tank, the slow-growing group of anaerobically ammonium-oxidizing bacteria (ANAMMOX) can be enriched in the aeration tank. The fraction of anaerobically ammonium-oxidizing bacteria (ANAMMOX), which, for example, makes up less than 10% of the biomass in a one-sludge system for pure nitrogen elimination, e.g. for treatment of wastewaters having high nitrogen concentrations with non-specific surplus sludge takeoff, can be increased to greater than 30% by separating the surplus sludge or returning the Planctomycetes into the aeration tank. The reaction volume of the tank can be correspondingly reduced thereby and the process stability of the plant increased. The wastewater constituents which are heavier than the Planctomycetes need to be separated before the aeration tank, since otherwise they would likewise accumulate in the system. Such a separation takes place in a primary clarifier or in a settling tank which, owing to the high settling rate of the Planctomycetes, can be dimensioned so as to be small. The plant for purifying the wastewater can be constructed as a single-stage one-tank plant, or as a multitank plant.

The temperature of the wastewater, which affects the existence or growth of the anaerobically ammonium-oxidizing bacteria (ANAMMOX), is no longer of critical importance owing to the method according to an embodiment of the invention, and so the deammonification can still be employed effectively and in a process-safe manner even with wastewaters having a temperature of approximately 7° C.

The temperature affects all bacteria more or less in the same manner (for instance a doubling of the growth rate per 10° C. temperature increase). However, in the case of conventional deammonification in a single-tank plant at low temperatures, a tank volume would be required that is so high that carrying out the deammonification would no longer be economical.

By returning the heavy phase of the surplus sludge from the aeration tank and simultaneously feeding the surplus sludge from the deammonifying tank of the sludge treatment into the aeration tank, a possibility is provided to employ the deammonification even in cold wastewaters having low nitrogen concentrations without needing to increase the tank volumes. At the same time, because no organic carbon is needed for the reaction of nitrogen compounds of the wastewater in the deammonification, a method is provided in which a nitrogen elimination, in particular a nitrate elimination (denitrification) becomes possible in the case of a low content of organic carbon. In addition, a considerable energy savings potential results in the case of the aeration of the wastewater in the aeration tank, since in the method according to an embodiment of the invention, an oxygen concentration of less than 1.0 mg/l is set, whereas in the conventional nitrification/denitrification in the conventional plants, an oxygen concentration of up to 3.0 mg/l must be provided.

Owing to the return of the heavy phase and the associated accumulation, the ratios of the anaerobically ammonium-oxidizing bacteria (ANAMMOX) to the nitrate-forming bacteria (NOB) also shift in favour of the anaerobically ammonium-oxidizing bacteria (ANAMMOX). The process of nitrification/denitrification is thereby shifted ever further towards deammonification.

After the deammonification of the high-nitrogen sludge water from the sludge treatment, or the sludge digestion, it is separated into an aqueous phase (sludge water) and a sludge phase (surplus sludge), for example by sedimentation. Since the aqueous phase still comprises residues of ammonium and nitrite, it proves to be particularly environmentally friendly if the sludge water (aqueous phase) purified by deammonification in the deammonifying tank after it is separated off from the sludge is likewise fed to the aeration tank.

From economic points of view, it appears to be particularly advantageous if the surplus sludge formed in the deammonification in the deammonifying tank and the purified sludge water are fed as suspension to the aeration tank. Only one conduit is thereby required for feeding the suspension.

The plant can be designed as a single-tank plant or as a multitank plant. In the case of design as a multitank plant, it is advantageously provided that the wastewater is fed to a secondary clarifier after the deammonification in the aeration tank, wherein the sludge settling in the secondary clarifier is fed in part as return sludge to the aeration tank and in part as surplus sludge to the sludge digestion.

Alternatively, or in addition, the wastewater may be purified in a primary clarifier before introduction into the aeration tank, wherein a primary sludge is fed to the sludge digestion together with the surplus sludge from the aeration tank or the secondary clarifier.

A particularly advantageous development of the present method is also achieved in that the surplus sludge resulting from the deammonification of the wastewater in the aeration tank is separated into a heavy sludge phase and a light sludge phase in a hydrocyclone. By using a hydrocyclone, also termed centrifugal separator, the surplus sludge may be separated particularly rapidly and in a process-safe manner into a heavy phase which is returned to the tank via an underflow of the cyclone, and a light phase that is removed from the system via an overflow.

In an alternative embodiment of the method according to the invention, it is provided that the surplus sludge resulting from the deammonification of the wastewater in the aeration tank is separated into a heavy sludge phase and a light sludge phase in a centrifuge. A centrifuge separates the surplus sludge, using mass inertia. The heavy sludge fraction having the higher density migrates outwards owing to the inertia thereof and displaces the lighter sludge fraction having the lower density into the centre of the centrifuge.

In addition, it is possible that the surplus sludge resulting from the deammonification of the wastewater in the aeration tank is separated into a heavy sludge phase and a light sludge phase by sedimentation. In this case, the surplus sludge is separated into a heavy phase and a light phase under the influence of gravity.

The single FIGURE shows a plant 1 for the biological purification of ammonium-containing wastewater in a simplified system presentation. In the plant 1 consisting of a primary clarifier 2, an aeration tank 3 and a secondary clarifier 4, municipal wastewater having greater or lesser fractions of industrial wastewaters is purified. The wastewater which, depending on the time of year, has a temperature from about 7 to 25° C. and a nitrogen concentration of about 20 to 100 mg/l, after a first mechanical purification which consists of a screen system 5 and the primary clarifier 2, is introduced (arrow 6) into an aeration tank 3.

In the aeration tank 3, the actual biological purification of the wastewater takes place. An oxygen concentration of less than 1.0 mg/l is set in the wastewater by an aeration appliance in the aeration tank 3 and the nitrogen compounds present in the wastewater are at least in part converted by deammonification into elemental nitrogen ($N_2$) which is outgassed into the ambient air as a harmless end product.

After the biological purification of the wastewater in the aeration tank 3, the wastewater-sludge mixture is fed (arrow 7) to the secondary clarifier 4 of the plant 1, in which the sludge settles from the water. The water is removed from the secondary clarifier 4 and passed (arrow 8) into the receiving body of water. The sludge is in part returned as return sludge into the aeration tank 3 (arrow 9) and is fed (arrow 11) in part as surplus sludge to a separating device that is constructed as a hydrocyclone 10. In the hydrocyclone 10, the surplus sludge that is formed in the aeration tank 3 is separated into a heavy sludge phase which contains mainly the anaerobically ammonium-oxidizing bacteria (ANAMMOX), and a light sludge phase, wherein the heavy sludge phase is returned (arrow 12) to the aeration tank 3. The light sludge phase is fed as surplus sludge to the sludge digestion or a digestion vessel 13 (arrow 14), wherein the sludge withdrawn from the wastewater in the primary clarifier 2 is also introduced (arrow 15) into the digestion vessel 13.

The sludge is heated to a temperature from about 35 to 40° C. in the digestion vessel 13 and/or during transport to the digestion vessel 13. During the sludge digestion in the digestion vessel 13, the organic constituents of the surplus sludge from the secondary clarifier 4 and of the sludge withdrawn from the wastewater in the primary clarifier 2 are converted into gas (methane). The nitrogen present remains in the sludge, which nitrogen is now present at a high concentration of typically 500 to 2000 mg/l. This high-nitrogen sludge, after the sludge digestion in the digestion vessel 13, is fed (arrow 17) to a sludge dewatering unit 16, for example a centrifuge, and dewatered. The aqueous phase contains the nitrogen after the sludge dewatering and has a temperature of about 25 to 39° C. The warm, high-nitrogen sludge water is then fed to a deammonifying tank 18 (arrow 19), whereas the sludge separated off from the sludge water is disposed of (arrow 20).

In the deammonifying tank 18, the nitrogen compounds ($NH_4$, organic nitrogen) present in the sludge water are converted by deammonification to elemental nitrogen ($N_2$) which is outgassed to the ambient air. The surplus sludge formed in the deammonification is then passed into the aeration tank 3 (arrow 21). Since the purified sludge water, even after the deammonification, still contains residues of ammonium and nitrite, the sludge water from the deammonifying tank 18 is also fed (arrow 22) to the aeration tank 3.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The invention claimed is:

1. A method for the biological purification of ammonium-containing wastewater, comprising:
   purifying the wastewater in an aeration tank in which a low oxygen concentration of less than 1.0 mg/L is set so as to first convert, using aerobically oxidizing bacteria, ammonium contained in the wastewater to nitrite and then to convert, using anaerobically oxidizing bacteria, ammonium and nitrite to elemental nitrogen;
   separating at least a part of surplus sludge formed in the aeration tank into a light sludge phase and a heavy sludge phase containing a majority of the anaerobically oxidizing bacteria, relative to the light sludge phase;
   returning the heavy sludge phase to the aeration tank;
   feeding the light sludge phase as surplus sludge to a sludge digestion, wherein organic constituents of the sludge are converted to gas;
   feeding sludge from the sludge digestion to a sludge dewatering;
   feeding high-nitrogen and warm sludge water that is separated off from the sludge in the sludge dewatering to a deammonifying tank;
   converting, by deammonification in the deammonifying tank, nitrogen compounds, comprising ammonium and organic nitrogen, in the sludge water to elemental nitrogen; and
   feeding surplus sludge formed in the deammonifying tank to the aeration tank.

2. The method according to claim 1, wherein the wastewater is cold wastewater between 7 and 25° C.,
   the sludge water, prior to being fed to the deammonifying tank, has a nitrogen concentration from 500 to 2000 mg/L and a temperature of about 25 to 39° C., and
   the anaerobically oxidizing bacteria are Planctomycetes.

3. The method according to claim 1, further comprising
   feeding the sludge water, after being separated off from the sludge and purified by the deammonification in the deammonifying tank, to the aeration tank.

4. The method according to claim 1, further comprising
   feeding the surplus sludge formed in the deammonifying tank and the sludge water purified by the deammonification in the deammonifying tank as a suspension to the aeration tank.

5. The method according to claim 1, further comprising
   feeding the wastewater from the aeration tank to a secondary clarifier,
   wherein sludge settling in the secondary clarifier is returned in part as return sludge to the aeration tank and is fed in part as the surplus sludge to the sludge digestion.

6. The method according to claim 1, further comprising
   purifying the wastewater in a primary clarifier before the purifying in the aeration tank,
   wherein a primary sludge from the primary clarifier is fed to the sludge digestion together with the surplus sludge from at least one of the aeration tank and a secondary clarifier disposed to receive the wastewater from the aeration tank.

7. The method according to claim 1, wherein the separating is performed in a hydrocyclone.

8. The method according to claim 1, wherein the separating is performed in a centrifuge.

9. The method according to claim 1, wherein the separating is performed by sedimentation.

10. The method according to claim 1, wherein the anaerobically oxidizing bacteria comprise a Planctomycete.

11. A method, comprising:
    (a) reacting wastewater comprising ammonium, in an aeration tank with an oxygen concentration of less than 1.0 mg/L, to form elemental nitrogen and a surplus sludge, by first contacting the wastewater with aerobically oxidizing bacteria to convert ammonium in the wastewater to nitrite, then contacting the wastewater with an anaerobically oxidizing bacteria, thereby converting the ammonium and the nitrite to elemental nitrogen;
    (b) separating the surplus sludge from the aeration tank into a light sludge phase and a heavy sludge phase comprising a majority of the anaerobically oxidizing bacteria, relative to the light sludge phase;
    (c) returning the heavy sludge phase to the aeration tank;
    (d) feeding the light sludge phase to a digesting;
    (e) digesting the light sludge phase, thereby converting an organic constituent comprised in the light sludge phase to gas, and obtaining the gas and a secondary sludge;
    (f) dewatering the secondary sludge, thereby separating off warm sludge water, comprising nitrogen, from a tertiary sludge;
    (g) deammonifying the tertiary sludge in a deammonifying tank, thereby converting a nitrogen component comprised in the tertiary sludge to elemental nitrogen, and obtaining the elemental nitrogen and a quaternary sludge; and
    (h) feeding the quaternary sludge to the aeration tank.

12. The method according to claim 11, wherein the wastewater has a temperature between 7 and 25° C.

13. The method according to claim 11, wherein the warm sludge water has a nitrogen concentration from 500 to 2000 mg/L and a temperature of about 25 to 39° C.

14. The method according to claim 11, wherein the nitrogen component of the tertiary sludge comprises ammonium, an organic nitrogen compound, or a mixture of two or more of these.

15. The method according to claim 11, wherein the anaerobically oxidizing bacteria comprise a Planctomycetes bacterium.

16. The method according to claim 11, further comprising: feeding a purified sludge water from the deammonifying tank, after the sludge water is separated off from the quaternary sludge, to the aeration tank.

17. The method according to claim 11, further comprising: feeding the quaternary sludge and a purified sludge water from the deammonifying tank as a suspension to the aeration tank.

18. The method according to claim 11, wherein the separating is performed in a hydrocyclone.

19. The method according to claim 11, wherein the separating is performed in a centrifuge.

20. The method according to claim 11, wherein the separating is performed by sedimentation.

* * * * *